(No Model.)
L. KNIGHT.
REAMER.
No. 346,111. Patented July 27, 1886.
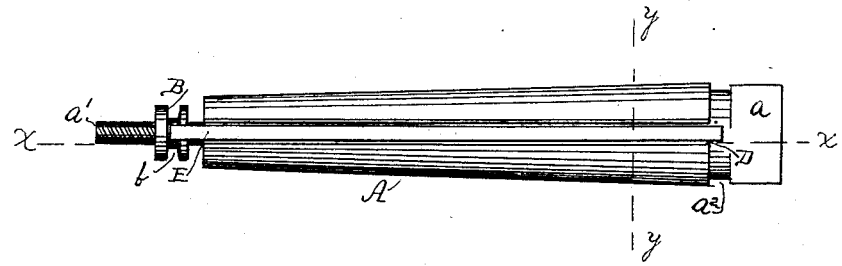
FIG. 2.
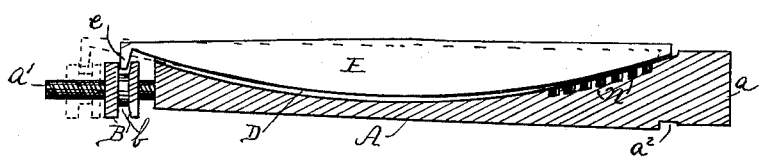
FIG. 1.
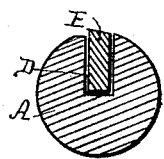  FIG. 3.   FIG. 4. 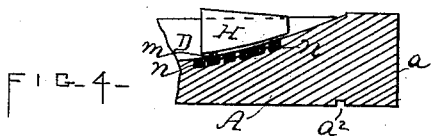
WITNESSES
Geo. A. Lane
Alexander Harris
INVENTOR
Lewis Knight
pr Wm. R. Gerhart
His Atty

UNITED STATES PATENT OFFICE.

LEWIS KNIGHT, OF LANCASTER, PENNSYLVANIA.

REAMER.

SPECIFICATION forming part of Letters Patent No. 346,111, dated July 27, 1886.

Application filed July 11, 1885. Serial No. 171,329. (No model.)

*To all whom it may concern:*

Be it known that I, LEWIS KNIGHT, a citizen of the United States, residing at Lancaster, in the county of Lancaster, State of Pennsylvania, have invented certain Improvements in Reamers, of which the following is a specification.

This invention relates to that class of implements used for enlarging or dressing out a hole previously made.

My improvements consist, first, in giving the blade a seat or bearing in the slot of the body of the reamer throughout its whole length, and in such manner that the said blade can be adjusted so as to act or cut at either end, more or less; and, second, an attachment by which an offset can be reamed in the hole or bore.

My reamer is particularly applicable to the re-dressing out of axle-bores which have been in use and become worn, or the cutting of conical boxes. The wear in axle-boxes which have been in use is irregular, either greater at one end or the other, and generally at both ends greater than in the center.

I accomplish my object by means of the mechanism illustrated in the accompanying drawings, forming part of this specification, in which similar letters of reference indicate corresponding parts in the several figures.

Figure 1 is a longitudinal vertical section through $x$ $x$ of Fig. 2. Fig. 2 is a top view of the device. Fig. 3 is a cross-section through $y$ $y$ of Fig. 2. Fig. 4 is a section of part of the reamer similar to that of Fig. 1, and shows the position of the short blade designed for reaming out offsets.

The body A of the reamer is provided at one end with the usual square shank, $a$, by which the power is applied for giving the necessary rotary motion to the tool, and at the other end with a screw-threaded projection, $a'$, upon which works the set-nut B, for varying the set of the blade. Throughout the entire length of the body of the reamer there extends a slot, D, which receives the cutting-blade E.

In the drawings the reamer is shown with but one slot and one blade, as most commonly used. The bottom of the slot has a concave surface, and the bottom surface of the blade is correspondingly convex. The blade is somewhat longer than the body of the reamer, and has a lip, $e$, at one end, which engages the groove $b$ in the set-nut B.

In order to allow room for the projecting end of the blade at the shank, said shank and the body of the reamer are connected by a short neck, $a^2$. When the point at which the blade is deepest coincides with the greatest depth of the slot, the outer or cutting edge of said blade is exposed, so as to cut uniformly throughout its length. When it is moved either way in the slot, the end of the blade in that direction is necessarily raised and the other correspondingly depressed, as shown by the dotted lines in Fig. 1. The lip $e$ is of sufficient length and the groove $b$ of the set-nut B of sufficient depth to allow for the variation in the projection of the various parts of the cutting-edge of the blade as it is moved one way or the other. The cutting-edge of the blade shown is somewhat convex for the purpose of reaming out the centers of axle-boxes when they are worn less than at the ends.

The reaming out of recesses in a bore is accomplished as follows: In the bottom of the concave groove there are circular holes $n$, adapted to receive corresponding projections $m$ on the bottom of a short blade, H. The amount of the projection of the cutting-edge of said blade is regulated by setting it back or forth longitudinally in the slot, as shown at R and S, Fig. 4.

What I claim as my invention, and desire to secure by Letters Patent, is—

1. In a reaming implement, the combination of the body A, having a slot with a concave bottom, with a blade adapted to be received by said slot, and having its inner edge of a convexity corresponding with the bottom of the slot, the stationary screw $a'$, and the set-nut B, substantially as specified.

2. In a reaming implement, the combination of the body of said implement, having a slot with a concave bottom, with a blade adapted to be received by said slot, and having its inner edge of a convexity corresponding with the bottom of the slot, and an attachment whereby said blade can be adjusted longitudinally in said slot, substantially as specified.

3. The combination, in a reaming implement, of the body of said reamer, having a slot for carrying the blade, with a blade having a convex cutting-edge, substantially as specified.

LEWIS KNIGHT.

Witnesses:
GEO. A. LANE,
WM. R. GERHART.